United States Patent [19]

Wittmer

[11] Patent Number: 4,912,599
[45] Date of Patent: Mar. 27, 1990

[54] BUS-TO-PLUG INTERLOCK

[75] Inventor: Daniel L. Wittmer, Hamilton, Ohio

[73] Assignee: Square D Company, Palatine, Ill.

[21] Appl. No.: 251,617

[22] Filed: Sep. 30, 1988

[51] Int. Cl.⁴ .......................... H01G 5/01; H01H 9/20
[52] U.S. Cl. .................... 361/378; 200/50 R
[58] Field of Search ............... 200/50 R, 50 B, 50 A, 200/51 R, 339, 376, 377, 378; 361/378

[56] References Cited

U.S. PATENT DOCUMENTS

| | | | |
|---|---|---|---|
| 1,620,792 | 3/1927 | Anderson et al. | 361/337 |
| 2,030,945 | 2/1936 | Smith et al. | 236/1 |
| 2,097,940 | 11/1937 | Watts | 200/15 |
| 2,678,976 | 5/1954 | Caswell | 200/50 AA |
| 2,705,266 | 3/1955 | Parish | 200/50 B |
| 3,110,778 | 11/1963 | Edmunds | 200/50 A |
| 3,316,452 | 4/1967 | Barlow | 361/339 |
| 3,339,038 | 8/1967 | Jorgensen et al. | 200/50 B |
| 3,343,042 | 9/1967 | Cellerini et al. | 361/339 |
| 3,657,606 | 4/1972 | Greger et al. | 361/378 |
| 4,074,091 | 2/1978 | Bischof et al. | 200/50 A |
| 4,154,993 | 5/1979 | Kumbera et al. | 200/50 A |
| 4,448,450 | 5/1984 | Kleinecke | 292/210 |
| 4,491,896 | 1/1985 | Rickmann | 361/339 |
| 4,513,180 | 4/1985 | Farag et al. | 200/50 R |
| 4,656,322 | 4/1987 | Paton et al. | 200/50 A |
| 4,728,757 | 3/1988 | Buxton et al. | 200/50 AA |
| 4,744,001 | 5/1988 | Krafft et al. | 361/338 |

Primary Examiner—J. R. Scott
Attorney, Agent, or Firm—James E. Lowe, Jr.; Lucian W. Beavers

[57] ABSTRACT

A plug-in apparatus for use with an electrical busway containing a plurality of bus bars includes an enclosure with an electrical accessory disposed therein. A plurality of plug-in jaws are connected to the electrical accessory and extend through a rear wall of the enclosure for engaging the bus bars. An operating handle is mounted outside of the enclosure. An interlock assembly includes an elongated interlock arm movably connected to the enclosure and extending in a generally horizontal direction across a plane of the rear wall of the enclosure. The interlock arm is movable relative to the enclosure between an unlocked position and a locked position. A safety link is operably associated with the operating handle and interlock assembly for preventing the operating handle and the interlock assembly from being simultaneously located in their "On" and unlocked positions, respectively. When the interlock arm is moved from its unlocked position to its locked position, the rearward portion thereof pivots upward relative to the enclosure so as to lock the plug-in apparatus to the busway. Further forward motion of the interlock arm slides the interlock arm forward without any additional pivotal motion so as to snugly secure the plug-in apparatus to the busway.

13 Claims, 4 Drawing Sheets

BUS-TO-PLUG INTERLOCK

BACKGROUND OF THE INVENTION

1. Field of the Invention

The present invention relates generally to bus plugs, and more particularly to bus plugs having an interlock mechanism for locking the bus plug on a busway.

2. Description of the Prior Art

Electrical power distribution systems often utilize plug-in busway comprising a generally rectangular cross section busway housing within which is carried a plurality of parallel bus bars which are the current conducting members.

Various electrical accessories such as fusable units, circuit breaker units, combination starter and contactor units, transformer units, capacitor units, and ground detector units, are provided in the form of plug-in units, commonly referred to simply as plugs or bus plugs, which plug into the busway thus providing quick, reliable and safe connection of the electrical accessory to the power conducting bus bars in the busway.

A typical busway and bus plug arrangement of the prior art is that shown in U.S. Pat. No. 3,339,038 to Jorgensen et al., and assigned to the assignee of the present invention.

The Jorgensen et al. patent discloses a bus plug having an interlock assembly for locking the bus plug to the busway. The interlock assembly prevents the bus plug from being connected to or disconnected from the busway when the electrical accessory contained within the bus plug is in an "On" position. It also prohibits the bus plug from being switched to an "On" position until the interlock assembly is moved to its locked position thus securely locking the bus plug in place on the busway.

While the Jorgensen et al. apparatus does successfully accomplish the functions just mentioned, and has been in use by the assignee of the present invention for many years, the interlock mechanism of the Jorgensen et al. apparatus is relatively complex and expensive to manufacture.

SUMMARY OF THE INVENTION

The present invention provides a bus plug which functions in a manner generally similar to that of the Jorgensen et al. device, but which has an improved and greatly simplified interlock assembly. The relative position and movements of the various elements of the bus plug of the present invention are described below in the context of a bus plug mounted on a horizontal busway. As is further explained below, however, the busway can, of course, be oriented vertically or in other non-horizontal positions.

The plug-in apparatus or bus plug of the present invention is constructed for use with an electrical busway containing a plurality of bus bars. The bus plug includes an enclosure having an electrical accessory, such as for example a circuit breaker, disposed within the enclosure.

A plurality of plug-in jaw means are connected to the electrical accessory and extend through a rear wall of the enclosure for engaging the plurality of bus bars.

An operating handle is mounted outside of the enclosure and is operably connected to the electrical accessory for switching the electrical accessory between "On" and "Off" positions.

An interlock assembly including an elongated interlock arm is movably connected to the enclosure and extends in a direction generally perpendicular to the rear wall of the enclosure. The interlock arm has a busway engagement means fixedly defined on a rearward portion thereof, and is movable relative to the enclosure between an unlocked position wherein the plug-in apparatus may be installed on or removed from the busway and a locked position wherein the plug-in apparatus is locked to the busway.

A safety means is operably associated with the operating handle means and interlock assembly for preventing the operating handle means and the interlock arm from being simultaneously located in their "On" and unlocked position, respectively.

The interlock assembly is so arranged and constructed that when the interlock arm is moved from its unlocked position to its locked position, the rearward portion of the interlock arm pivots upward in a generally vertical plane generally perpendicular to a length of the busway, so as to engage the busway engagement means with a bottom rail of the busway and thereby lock the plug-in apparatus to the busway. The interlock assembly is further arranged and constructed so that after the rearward portion of the interlock arm pivots upward, the interlock arm slides forward so as to snugly secure the plug-in apparatus to the busway.

The interlock assembly of the present invention is greatly simplified as compared to that utilized with the Jorgensen et al device.

Whereas the Jorgensen et al. device utilized a sliding actuating member 116 which actuated a clamping member 122 held in a generally rectangular bracket 120, the present invention replaces all of those components with a single member, namely the interlock arm which is slidably and pivotally connected to the enclosure in such a way as to effectively replace all three of the mentioned components of the Jorgensen et al. structure.

In addition to being much simpler and less expensive to manufacture, the interlock assembly of the present invention is much smoother in operation and thus easier and more reliable to use than is the interlock assembly of the Jorgensen et al. device.

Accordingly, it is a purpose of the present invention to provide a plug-in apparatus for use with electrical busway which is relatively simple and inexpensive to manufacture.

Another purpose of the present invention is to provide a plug-in apparatus for use with electrical busway having an interlock assembly which is smooth and reliable in its operation.

Another purpose of the present invention is to provide a plug-in apparatus for use with electrical busway, having an interlock assembly utilizing a minimum number of moving parts.

Yet another purpose of the present invention is to provide a plug-in apparatus for use with an electrical busway, having an interlock assembly capable of accommodating the manufacturing tolerances permitted in the busway dimensions, so that the plug-in apparatus will be snugly secured to any busway which may be encountered in the field.

Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
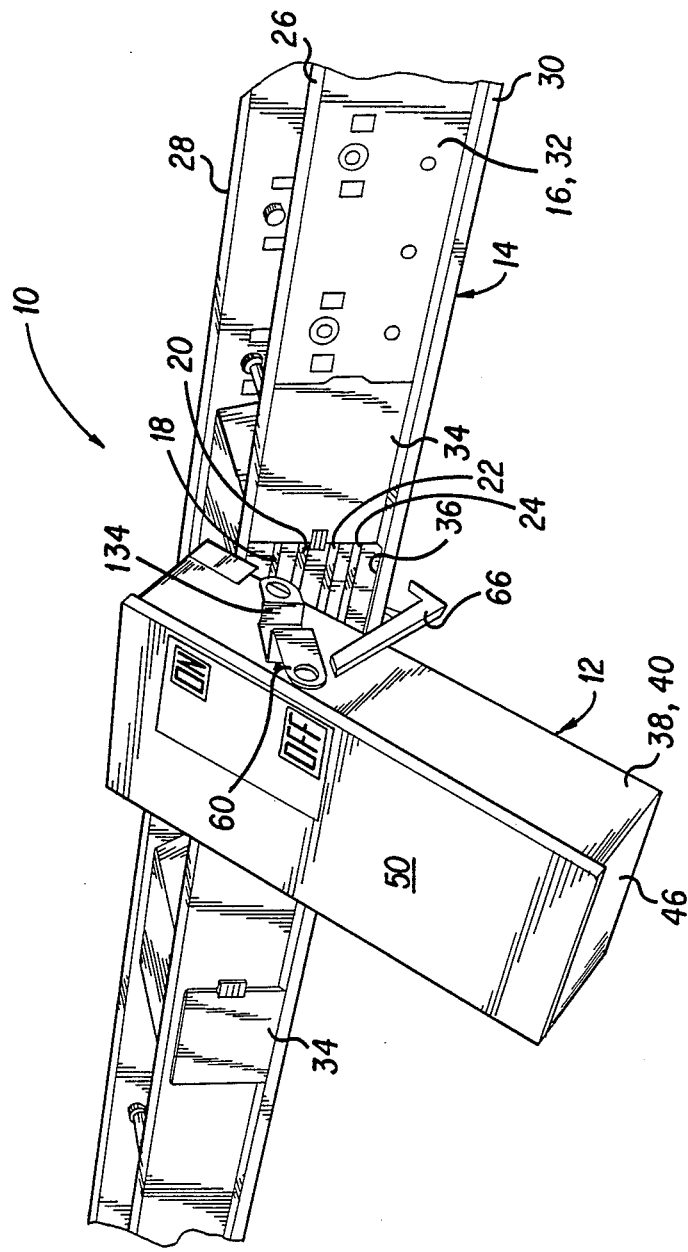
FIG. 1 is an isometric view of the plug-in apparatus of the present invention which has been hung from the top rail of a busway and is not yet swung into place on the busway.

Referring now to the drawings, and particularly to FIG. 1, a plug-in busway system is there shown and generally designated by the numeral 10. The system 10 includes a plug-in apparatus, commonly referred to as a bus plug or simply a plug, designated by the numeral 12, and a busway designated by the numeral 14.

The busway 14 is of a well-known construction and includes a generally rectangular cross section outer conduit 16 within which are contained a plurality of lengthwise extending generally parallel flat electrical conductors 18, 20, 22 and 24 known as bus bars.

The conduit 16 of busway 14 can generally be described as having top rails 26 and 28 and a pair of bottom rails, only one of which, denoted by the numeral 30, is seen in FIG. 1.

Figure 2:
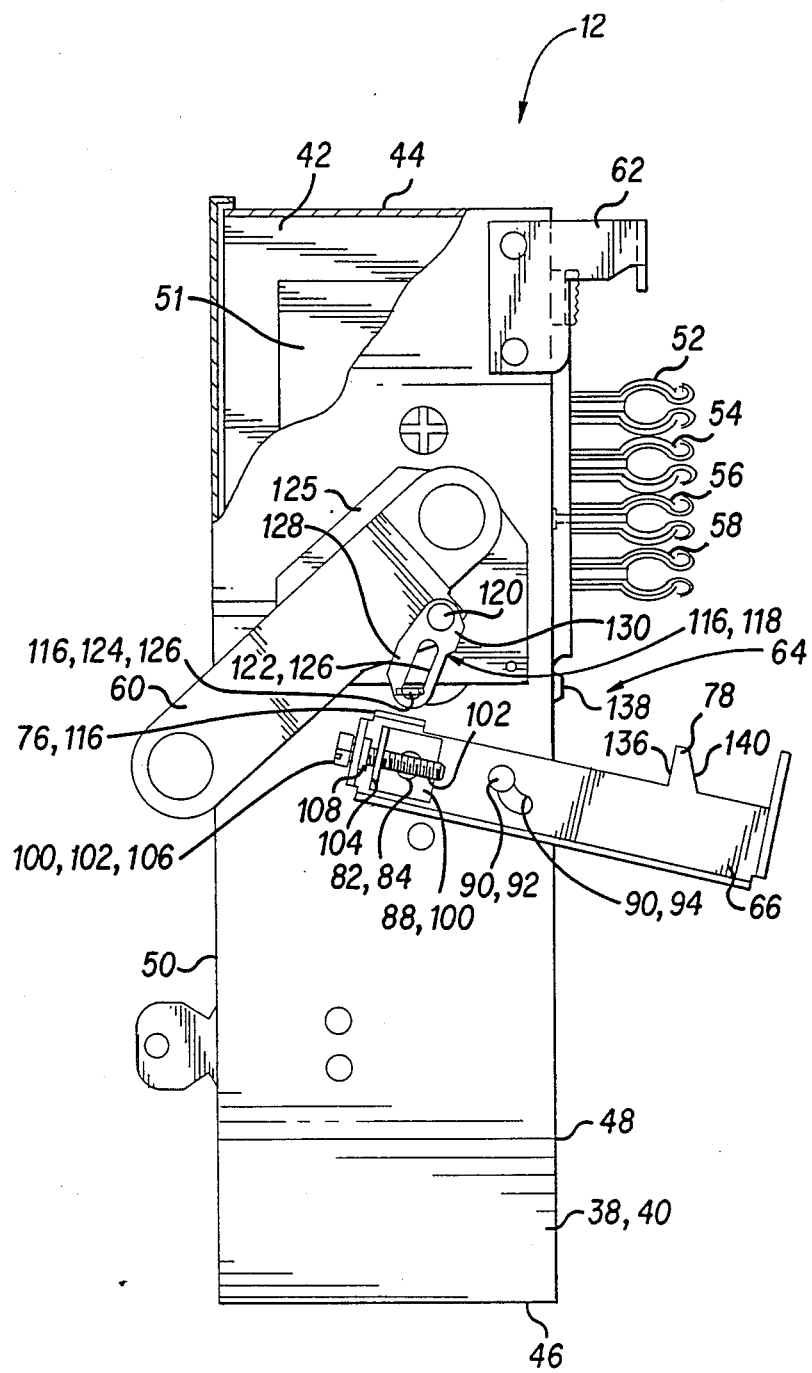
FIG. 2 is a right-side elevation view of the plug-in apparatus of FIG. 1, having its interlock means in an open position and its operating handle in an "Off" position, as they would be when the apparatus was placed upon or removed from a busway. The apparatus is partially cut away in FIG. 2 to show the electrical accessory contained therein.
Figure 3:
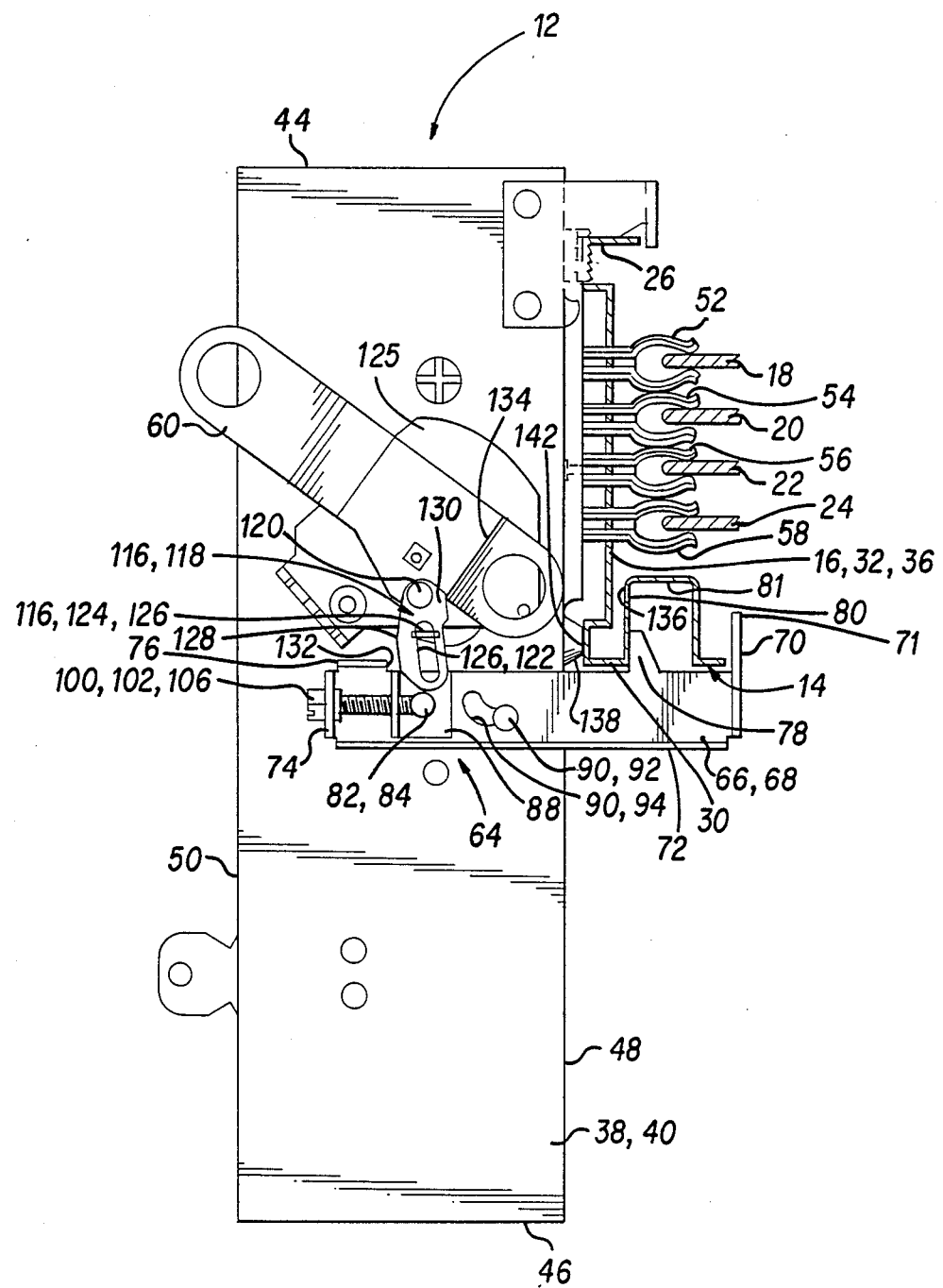
FIG. 3 is a view similar to FIG. 2 after the plug-in apparatus has been mounted on the busway and after the interlock assembly has been moved to its locked position thus snugly securing the plug-in apparatus to the busway. The operating handle is in an "On" position.

The invention is illustrated in FIGS. 1–3 in the context of a horizontally extending busway 14. It will be understood that the bus plug 12 could also be used with a busway oriented vertically or in any other non-horizontal position.

A side wall 32 spans between top and bottom rails 26 and 30. Hinged panels such as 34 fold out of the way to expose plug openings 36.

As best seen in FIG. 2, the plug-in apparatus 12 includes a generally box-shaped enclosure 38 having a right side wall 40, left side wall 42, top wall 44, bottom wall 46, rear wall 48, and a hinged front door or wall 50.

An electrical accessory 51 is disposed within the enclosure. The plug-in apparatus 12 and its included accessory 51 may comprise any one of a number of types of plug-in units, such as for example a fusable unit, a circuit breaker unit, a combination starter and contactor unit, a transformer unit, a capacitor unit, or a ground detector unit, among others.

The apparatus 12 includes a plurality of plug-in jaw means 52, 54, 56 and 58 which are connected to the electrical accessory 51 and extend through an opening in the rear wall 48 for engaging the bus bars 18, 20, 22 and 24, respectively.

An operating handle means 60 is mounted outside of the enclosure 38 on the right side wall 40 thereof and is operably connected to the electrical accessory 51 for switching the electrical accessory 51 between "On" and "Off" positions. As is seen in FIG. 1, the front door 50 has "On" and "Off" indications thereon corresponding to the position of the forward end of operating handle 60 in the "On" and "Off" positions. In FIGS. 1 and 2, the operating handle 60 is shown in its "Off" position. In FIG. 3, the operating handle 60 is shown in its "On" position.

The enclosure 38 includes a hanger means or first busway engagement means 62 for hanging the enclosure 38 on the top rail 26 of busway 14. It will be understood that the term "hanging" is used only in a very general sense, and that if the busway 14 is oriented vertically the hanger means 62 can still be generally described as a means for hanging the enclosure 38 on the rail 26 of busway 14.

As is best seen in FIGS. 2 and 3, the plug-in apparatus 12 includes an interlock assembly generally designated by the numeral 64.

The interlock assembly 64 includes an elongated interlock arm 66 which is movably connected to the enclosure 38 and extends across a plane of the rear wall 48 in a generally horizontal direction which can also be described as a direction generally normal to said plane of said rear wall. It will be understood that it is not necessary for the interlock arm to always, if ever, be in an exactly horizontal position. The rear wall 48 of the enclosure 38 will generally be oriented in a substantially vertical plane when the apparatus 12 is in its normal position of use assembled with the horizontal busway 14, as seen in FIG. 3, and the elongated interlock arm will extend across the plane in which the rear wall 48 lies.

Figure 4:
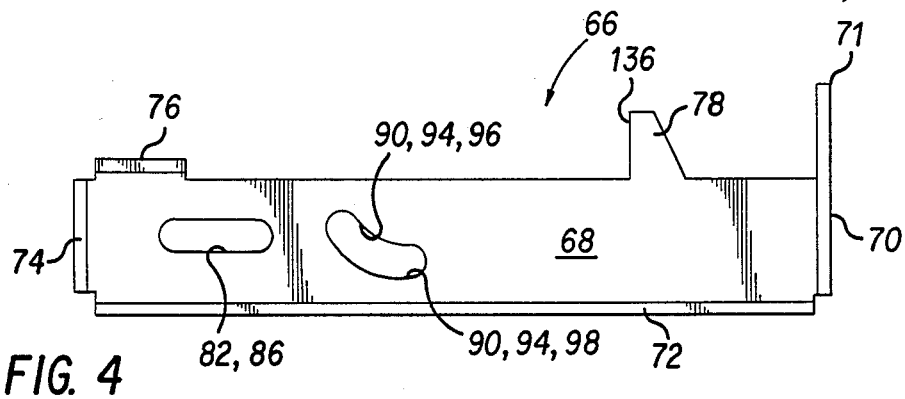
FIG. 4 is a right-side elevation view of the interlock arm as it is seen in FIG. 3, with the other structures having been removed.
Figure 5:
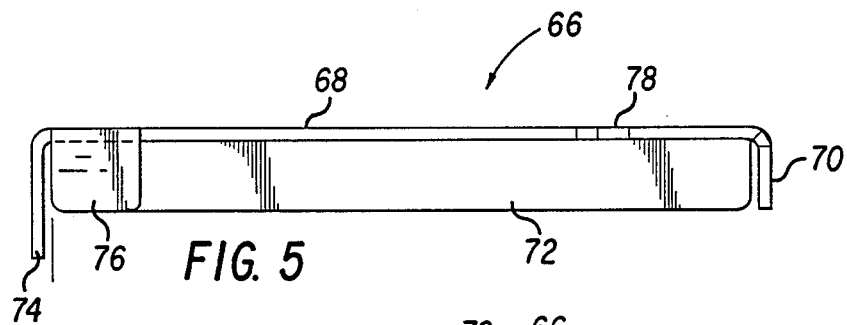
FIG. 5 is a top plan view of the interlock arm of FIG. 4.
Figure 6:
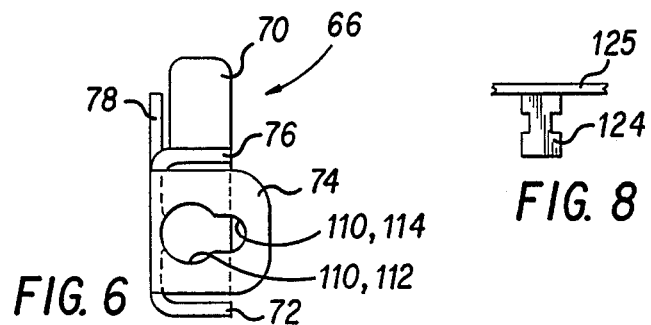
FIG. 6 is a front end elevation view of the interlock arm of FIG. 4.

The interlock arm 66 is shown in right-side elevation, top plan view, and front end elevation in FIGS. 4, 5 and 6, respectively.

Interlock arm 66 is formed from bent sheet metal, and includes a flat, rectangular-shaped main portion 68 having first, second, third and fourth flanges 70, 72, 74, and 76, respectively, extending therefrom away from the enclosure 38. Also, a dorsal-fin-shaped second busway engagement means 78 extends upward from main portion 68 in the same plane as main portion 68.

The dorsal fin 78 provides a means for engaging a rear surface 80 of lower rail 30 of busway 14 as seen in FIG. 3. The dorsal fin 78 is integrally formed with the main portion 68, and thus is fixedly defined on the rearward or outer portion of interlock arm 66.

The interlock assembly 64 is so arranged and constructed that when the interlock arm 66 is moved from its unlocked position of FIG. 2 to its locked position of FIG. 3, the rearward portion of interlock arm 66 pivots upwardly relative to the enclosure 38 so that the dorsal fin 78 is received within channel 81 adjacent bottom rail 30 to thereby lock the apparatus 12 to the busway 14.

The interlock arm 66 pivots upward in a generally vertical plane which is generally perpendicular or normal to a length of the busway 14.

The interlock assembly 64 is further arranged and constructed so that after the rearward portion of the interlock arm 66 pivots upward, the interlock arm slides forward, in a manner further described below, so that dorsal fin 78 engages rear surface 80 of bottom rail 30 to snugly secure the apparatus 12 to the busway 14 as illustrated in FIG. 3.

The interlock assembly includes a sliding pivot point means 82 including a pivot pin 84 fixed to the right side wall 40 of enclosure 38 and a generally horizontal pivot pin receiving slot 86 (see FIG. 4) disposed in the main portion 68 of interlock arm 66. The horizontal slot 86 can also be described as extending in a direction generally normal to the plane of the rear wall 48.

In FIGS. 2 and 3, the generally horizontal pivot pin receiving slot 86 is hidden by an L-shaped bracket 88, the function of which is described below, which itself is pivotally received on pin 84.

The sliding pivot point means 82, including the pivot pin 84 and slot 86, allows the interlock arm 66 to slide relative to enclosure 38 and to pivot relative to the enclosure 38 about the pivot pin 84.

The interlock assembly 64 further includes a cam and follower means 90, operatively associated with the enclosure 38 and the interlock arm 66, for defining a path of the motion of interlock arm 66 relative to the enclosure 38. The cam and follower means 90 includes a cam follower pin 92 fixed to the right side wall 40 of enclosure 38 and a cam pin receiving slot 94 disposed through the main portion 68 of interlock arm 66.

The cam pin receiving slot 94 is a dog leg shape as best seen in FIG. 4, and includes a generally non-horizontal first portion 96, and a generally horizontal second portion 98. The non-horizontal first slot portion 96 can also be described as extending in a direction generally skewed to the plane of rear wall 48. The horizontal second slot portion 98 can be described as extending in a direction generally normal to the plane of rear wall 48.

The interlock assembly 64 further includes a positioning means 100 connected between the enclosure 38 and the interlock arm 66 for selectively moving the interlock arm 66 between the unlocked position of FIG. 2, and the locked position of FIG. 3.

This positioning means 100 includes a threaded bolt or rod 102 rotatably attached to the interlock arm 66 and having its threaded portion received in a threaded receptacle defined in a leg 104 of bracket 88 which itself can be considered to be a portion of the positioning means 100.

The threaded rod 102 has a head 106 defined thereon which is hexagonally shaped and also includes a screwdriver slot and cross-recess for operation thereof.

The rod 102 further includes an annular collar 108 spaced from the head 106.

As best seen in FIG. 6, the third flange 74 of interlock arm 66 has a key-shaped opening 110 disposed therethrough which has an enlarged portion 112 and a reduced portion 114.

During assembly of the interlock assembly 64, the collar 108 is inserted through the enlarged portion 112 and then the rod 102 is moved into the reduced portion 114 of opening 110 so that the rod 102 is then longitudinally fixed relative to flange 74, but is rotatable relative thereto.

As previously mentioned, the bracket 88 is pivotally supported on pivot pin 84 which is fixed to the side wall 40 of enclosure 38, so that rotation of the threaded rod 102 causes the interlock arm 66 to be moved relative to enclosure 38.

When the interlock arm 66 is in its unlocked position as shown in FIG. 2, the threaded rod 102 extends substantially entirely through the flange 104, and the cam pin 92 is received in the upper leftmost extremity of the non-horizontal portion 96 of cam pin receiving slot 94.

As the threaded rod 102 is rotated to move the interlock arm 66 from its unlocked position of FIG. 2 to its locked position of FIG. 3, the path of the interlock arm 66 is defined by the cam and follower means 90 such that the interlock arm 66 first slides forward, i.e., to the left in FIGS. 2 and 3, while simultaneously pivoting its rearward portion upward as the cam pin 92 moves through the angled non-horizontal portion 96 of cam pin receiving slot 94, and then the interlock arm 66 slides further horizontally forward without any additional pivoting motion as the cam pin receiving slot horizontal portion 98 moves relative to the cam pin 92.

The plug-in apparatus 12 also includes a safety means generally designated by the numeral 116. Safety means 116 is operably associated with the operating handle means 60 and the interlock assembly 64 for preventing the operating handle means 60 and the interlock arm 66 from being simultaneously located in their "On" position and unlocked position, respectively.

The safety means 116 includes a safety link 118 pivotally connected to operating handle means 60 at pin 120. The safety link 118 has a guide slot 122 defined therein which is slidably received about the necked down portion of a T-shaped positioning guide 124 which is fixedly attached to the right-side wall 40 of enclosure 38. The guide slot 122 and positioning guide 124 define a safety link guide means 126 for defining a path of the safety link 118 relative to the enclosure 38 as the operating handle means 60 is moved between its "On" position of FIG. 3 and its "Off" position of FIG. 2.

Figure 8:
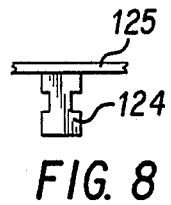
FIG. 8 is an enlarged plan view of a cut-away portion of the base plate 125.

The positioning guide 124 is an integral part of a base plate 125 which is fixed to right side wall 40 of enclosure 38. The T-shape of positioning guide 124 is best seen in FIG. 8 which is an enlarged plan view of a cut-away portion of base plate 125. Other components of bus plug 12 have been eliminated in FIG. 8 for ease of illustration.

In FIG. 2, the interlock assembly 64 is shown in its unlocked position, with the interlock arm 66 moved fully rearward and pivoted downward. In FIG. 2, the operating handle means is shown in its "Off" position. It will be apparent from viewing FIG. 2, that if one attempts to move the operating handle means 60 from its "Off" position to its "On" position with the interlock assembly 66 in its unlocked position as shown in FIG. 2, the lower end of safety link 118 will abut fourth flange 76 of interlock arm 66 thus preventing the operating handle means 60 from being moved to its "On" position. Thus, it is impossible for the plug-in apparatus 12 to be plugged into the busway 14 when the operating handle means 60 is in an "On" position.

This safety feature is also in effect after the bus plug 12 is plugged into busway 14. It is still impossible after the bus plug 12 is plugged into busway 14 for the bus plug 12 to be electrically engaged with busway 14, i.e., to be switched "On", when the interlock arm 66 is moved fully rearward and pivoted downward to its unlocked position as shown in FIG. 2.

The fourth flange 76 of interlock arm 66 may be considered to be a portion of the safety means 116 since it interacts with the safety link 118.

As is apparent in FIGS. 2 and 3, the safety link 118 has a somewhat irregular shape, including a forward extending protrusion 128 near its lower end and a rearward extending protrusion 130 near its upper end.

The forward extending protrusion 128 provides a means for preventing the interlock arm 66 from moving from its locked position to its unlocked position when the operating handle means 60 is in an "On" position. This is best appreciated in viewing FIG. 3, where the operating handle 60 is shown in its locked position. It will be apparent that if the threaded rod 102 is rotated so as to move the interlock arm 66 rearward toward its unlocked position, a rearward edge 132 of fourth flange 76 of interlock arm 66 will abut the forward protrusion 128 of safety link 118.

The rearward extending protrusion 130 provides a means for abutting the operating handle means 60, as seen in FIG. 3, and preventing motion thereof in a clockwise direction as viewed in FIG. 3, thus defining the "On" position of the operating handle means 60. As is apparent in FIG. 3, the rearward extending protrusion 130 abuts a dog leg 134 of operating handle means 60. The dog leg 134 is best seen in FIG. 1.

ALTERNATIVE EMBODIMENT OF FIG. 7

Figure 7:
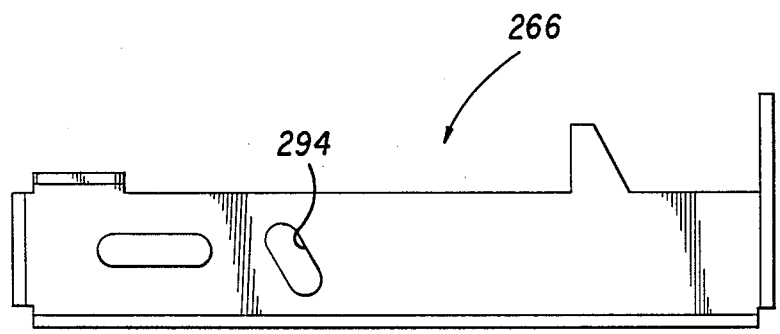
FIG. 7 is a view similar to FIG. 4 of a modified interlock arm illustrating an alternative embodiment of the present invention.

FIG. 7 illustrates a modified interlock arm 266. The interlock arm 266 is similar to the interlock arm 66 except for a modification of the cam pin receiving slot.

Basically, the horizontal portion 98 of the cam pin receiving slot 94 of FIG. 4 has been deleted to provide a cam pin receiving slot 294 of FIG. 7 which has only a non-horizontal component equivalent to the non-horizontal portion 96 of cam pin receiving slot 94.

By substitution of the alternative interlock arm 266 for the original interlock arm 66, an apparatus will be provided which will operate in all respects like the apparatus 12 previously described, except that the motion of the interlock arm 266 when moving from an unlocked position similar to FIG. 2 to a locked position similar to FIG. 3 will consist solely of a simultaneous forward sliding and upward pivoting motion. There will be no further solely horizontal motion as was present with the original interlock arm 66.

The operational result of this difference is that the interlock arm 266 of FIG. 7 cannot accommodate the dimensional tolerance variations which can be accommodated by the interlock arm 66 of FIG. 4.

If, however, the interlock arm 266 is utilized with a busway 14 of compatible dimensions, it will in all respects operate satisfactorily to lock the apparatus 12 to the busway 14.

SUMMARY OF OPERATION

The manner of operation of the plug-in busway system 10, and particularly of the plug-in apparatus 12 and the interlock assembly 64 and safety means 116 thereof is as follows.

Prior to assembly of the plug-in apparatus 12 with the busway 14, the apparatus 12 has its operating handle means 60 placed in an "Off" position, and its interlock assembly 64 placed in an unlocked position as illustrated in FIG. 2.

Then, the hinged panel 34 of the busway 14 is folded out of the way to expose plug opening 36 in busway 14.

The hanger means 62 of apparatus 12 is then placed over the top rail 26 of busway 14 as illustrated in FIG. 1. Then the lower end of apparatus 12 is swung down toward the busway 14 essentially pivoting the apparatus 12 about the top rail 26. This motion is continued until the plug-in jaws 52, 54, 56 and 58 engage the bus bars 18, 20, 22 and 24, respectively, as illustrated in FIG. 3.

Next, the threaded rod 102 is rotated to move the interlock arm 66 of interlock assembly 64 forward in a direction generally away from the busway 14.

As the interlock arm 66 moves forward, the action of the cam and follower means 90 causes the interlock arm 66 to first pivot its rearward portion upward simultaneously as the interlock arm 66 is sliding forward. This occurs as the cam pin 92 moves through the non-horizontal portion 96 of cam pin receiving slot 94.

This first phase of motion of the interlock arm 66 moves the dorsal fin 78 thereof up into the open lower channel 81 of busway 14, thereby locking the apparatus 12 to the busway 14.

Then, the continued forward motion of interlock arm 66, as the cam pin 92 slides through the horizontal portion 98 of cam pin receiving slot 94, occurs without any additional pivoting motion of the interlock arm 66. This additional forward sliding motion of interlock arm 66 causes a forward edge 136 of dorsal fin 78 to engage the rear surface 80 of bottom rail 30 and then snugly clamps the bottom rail 30 between dorsal fin 78 and a rearward extending protrusion 138 of rear wall 48 of enclosure 38. This snugly secures the apparatus 12 to the busway 14.

The purpose of the horizontal second phase of motion of the interlock arm 66 is to accommodate dimensional variations which are encountered with various busways which are in use. The forward sliding motion of interlock arm 66 allows it to snugly engage any busway with which it may be used.

Then, the operating handle means 60 can be moved to its "On" position as illustrated in FIG. 3 to cause current to flow from the bus bars through the electrical accessory 51.

A number of additional safety features are provided by the interlock assembly 64 and the safety means 116.

When the operating handle means 60 is in its "On" position as illustrated in FIG. 3, it is impossible for the interlock assembly 64 to be moved to an unlocked position. Thus, it is impossible to remove the apparatus 12 from the busway 14 without first turning the operating handle means 60 to an "Off" position. This feature is provided by the forward extending protrusion 128 on safety link 118, which would abut with the rear edge 132 of fourth flange 76 of interlock arm 66 if an attempt is made to slide the interlock arm 66 rearward to try to unlock it.

Also, it will be apparent that if, prior to assembly of the apparatus 12 with the busway 14, one were to place the interlock assembly 64 in its locked position and the operating handle means 60 in an "On" position as generally illustrated in FIG. 3, it would then be impossible to assemble the apparatus 12 with the busway 14 without first turning the operating handle 60 to an "Off" position and then moving the interlock assembly 64 to an unlocked position. The reason for this is that when the interlock assembly 64 is in a locked position as illustrated in FIG. 3, if an attempt were made to place the apparatus 12 upon the busway 14, a rearward point 71 of first flange 70 would abut a forward facing surface 142 of bottom rail 30. If this occurs there will be no contact of plug-in jaws 52, 54, 56 and 58 with bus bars 18, 20, 22 and 24, and thus no electrically alive conductors within enclosure 38.

Thus it is seen that the apparatus and methods of the present invention readily achieve the ends and advantages mentioned as well as those inherent therein. While certain preferred embodiments of the invention have been illustrated and described for the purposes of the present invention, numerous changes in the arrangement and construction of parts and steps may be made by those skilled in the art, which changes are encompassed within the scope and spirit of the present invention as defined by the appended claims.

What is claimed is:

1. A plug-in apparatus for use with an electrical busway containing a plurality of bus bars, said apparatus comprising:

an enclosure;

an electrical accessory disposed within said enclosure;

a plurality of plug-in jaw means connected to said electrical accessory and extending through a rear wall of said enclosure for engaging said plurality of bus bars;

an operating handle means, mounted outside of said enclosure and operably connected to said electrical accessory for switching said electrical accessory between "On" and "Off" positions;

an interlock assembly including an elongated interlock arm, moveably connected to said enclosure and extending across a plane of said rear wall in a direction generally normal to said plane of said rear wall, said interlock arm having a busway engagement means on a rearward portion thereof, said interlock arm being movable relative to said enclosure between an unlocked position wherein said plug-in apparatus may be installed on or removed from said busway and a locked position wherein said plug-in apparatus is locked to said busway;

sliding pivot means cooperatively connected to said enclosure and to said interlock arm and fixed relative to one of said enclosure and said interlock arm for causing said interlock arm both to slide relative to said enclosure and to pivot relative to said enclosure within the same plane; and positioning means, connected between said enclosure and said interlock arm, for selectively moving said interlock arm between its unlocked and locked positions, and safety means, operably associated with said operating handle means and said interlock assembly, for preventing said operating handle means and said interlock arm from being simultaneously located in their "On" position and unlocked position, respectively.

2. The apparatus of claim 1, wherein:

said enclosure includes hanger means for hanging said enclosure on a rail of said busway; and said interlock assembly is so arranged and constructed that when said interlock arm is moved from its said unlocked position to its said locked position, said rearward portion of said interlock arm pivots relative to said enclosure toward said busway in a plane generally perpendicular to a length of said busway so as to lock said plug-in apparatus to said busway.

3. The apparatus of claim 2, wherein:

said interlock assembly is so arranged and constructed that after said rearward portion of said interlock arm pivots toward said busway, said interlock arm slides forward so as to snugly secure said plug-in apparatus to said busway.

4. The apparatus of claim 2, wherein said sliding pivot means comprises:

sliding pivot point means, fixed relative to one of said enclosure and said interlock arm, for allowing said interlock arm to slide relative to said enclosure and to pivot relative to said enclosure about said pivot point means; and cam and follower means, operatively associated with and cooperatively connected to said enclosure and to said interlock arm, for defining the path of the sliding and pivoting motion of said interlock arm relative to said enclosure about said sliding pivot means.

5. The apparatus of claim 4, wherein:

said sliding pivot means includes a pivot pin fixed to one of said enclosure and said interlock arm and a pivot pin receiving slot disposed in the other of said enclosure and said interlock arm, said slot extending in a direction generally normal to said plane of said rear wall.

6. The apparatus of claim 5, wherein:

said cam and follower means includes a cam follower pin fixed to one of said enclosure and said interlock arm and spaced from said pivot pin and a cam pin receiving slot spaced from said pivot pin receiving slot and disposed in the other of said enclosure and said interlock arm, said cam pin receiving slot extending in a direction generally skewed to said plane of said rear wall.

7. The apparatus of claim 1, wherein:

said positioning means includes a threaded rod rotatably attached to one of said enclosure and said interlock arm and received in a threaded receptacle attached to the other of said enclosure and said interlock arm.

8. The apparatus of claim 4, wherein:

said cam and follower means is further characterized in that said path is defined such that when said interlock arm moves from said unlocked to said locked position said interlock arm first slides forward while simultaneously pivoting its said rearward portion upward toward said busway and then slides further forward without any additional pivoting motion.

9. The apparatus of claim 8, wherein:

said cam and follower means includes a cam follower pin attached to one of said enclosure and said interlock arm and a cam pin receiving slot disposed in the other of said enclosure and said interlock arm, said slot including a first slot portion extending in a direction generally skewed to said plane of said rear wall for defining the first sliding and simultaneous pivoting motion and said slot including a second slot portion extending in a direction generally normal to said plane of said rear wall for defining the further forward sliding motion of said interlock arm.

10. The apparatus of claim 1, wherein:

said busway engagement means and said interlock arm are two integral parts of the same member.

11. The apparatus of claim 1, wherein:

said safety means includes a safety link pivotally connected to said operating handle means and a safety link guide means for defining a path of said safety link relative to said enclosure as said operating handle means is moved between its "On" and "Off" positions.

12. The apparatus of claim 11, wherein:

said safety link includes a forward extending protrusion means for preventing said interlock arm from moving from its said locked to its said unlocked position when said operating handle means is in its said "On" position.

13. The apparatus of claim 11, wherein:
said safety link includes a protrusion means for abutting said operating handle means and preventing motion thereof in one direction thus defining said "On" position of said operating handle means.

* * * * *